July 4, 1939.　　　　　J. G. LEE　　　　　2,164,531
CONTROL DEVICE FOR AIRPLANES
Filed Dec. 4, 1935　　　2 Sheets-Sheet 1
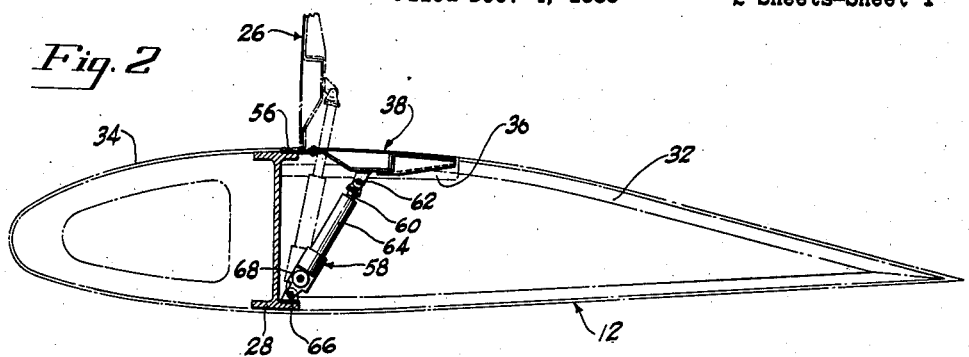
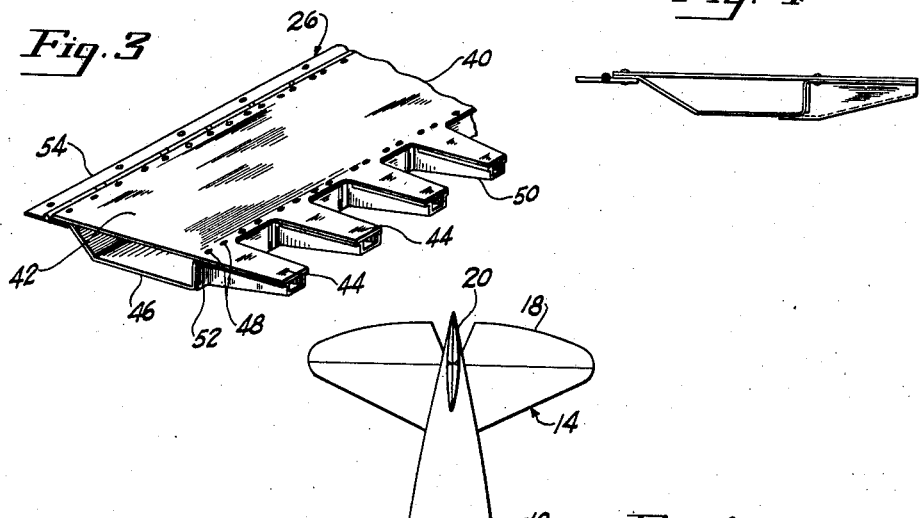
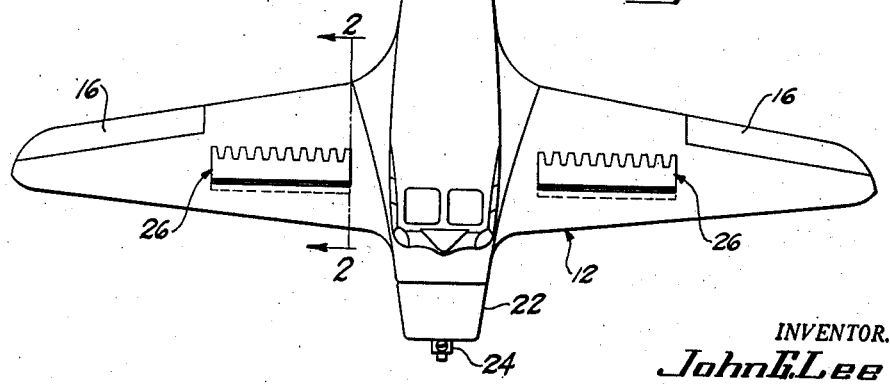
INVENTOR.
John G. Lee
BY
ATTORNEY July 4, 1939.   J. G. LEE   2,164,531
CONTROL DEVICE FOR AIRPLANES
Filed Dec. 4, 1935   2 Sheets-Sheet 2
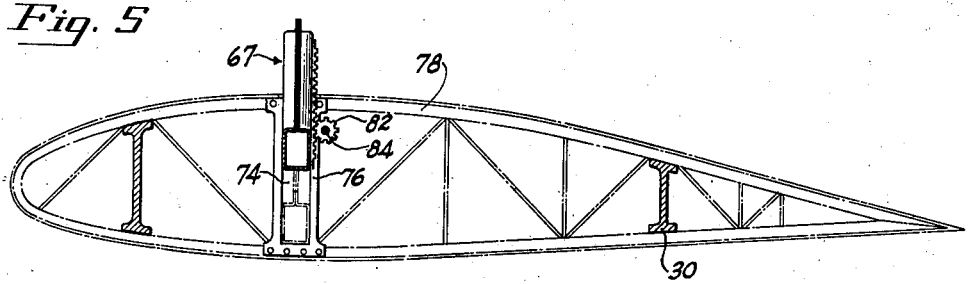
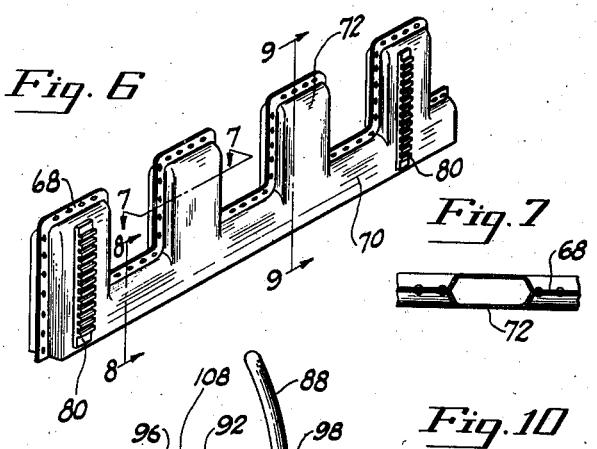
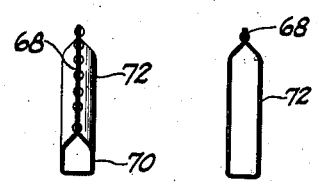
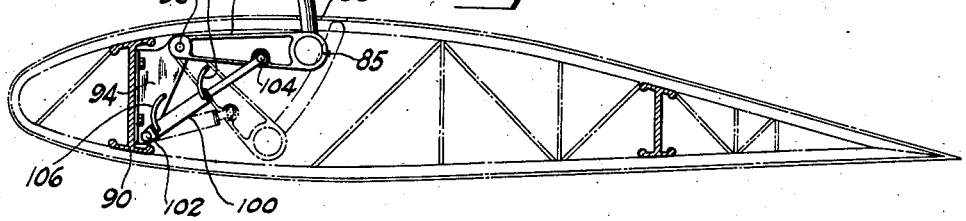
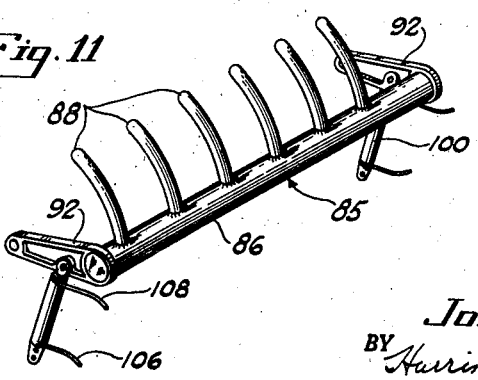
INVENTOR.
John G. Lee
BY Harris G. Luther
ATTORNEY

Patented July 4, 1939

2,164,531

UNITED STATES PATENT OFFICE

2,164,531

CONTROL DEVICE FOR AIRPLANES

John G. Lee, Farmington, Conn., assignor to United Aircraft Corporation, East Hartford, Conn., a corporation of Delaware Application December 4, 1935, Serial No. 52,883

10 Claims. (Cl. 244—113)

This invention relates to improvements in speed control devices such as air brakes for airplanes and the like, and has particular reference to an air brake in the form of a flap adjustably attached to some portion of the airplane such as the airplane wing.

One of the objects of the invention resides in the provision of controllable means such as an adjustable flap device for increasing the drag of an airplane to reduce its speed under certain conditions of operation.

A further object resides in the provision of an air brake flap for an airplane that will not subject the tail surfaces of the airplane to undue turbulence effects.

A still further object of the invention resides in the provision of a device of the character described that will have no effect upon the operation of the airplane when the device is retracted.

An additional object resides in the provision of a device of the character described that is sufficiently strong and durable to support the loads imposed upon it by the movement of the airplane at high speed relative to the surrounding air and which at the same time is so light in construction that it does not add any appreciable burden to the airplane.

Other objects and advantages will be more particularly pointed out hereinafter or will become apparent as the description proceeds.

In the accompanying drawings in which like reference numerals are used to designate similar parts throughout, there has been illustrated what is now considered to be the preferred form of the device of the invention, and two somewhat modified forms thereof. The drawings, however, are for the purpose of illustration only and are not to be taken as limiting the invention, the scope of which is to be measured entirely by the scope of the appended claims.

In the drawings, Fig. 1 is a plan view of a suitable form of airplane showing the device of the invention attached thereto.

Fig. 2 is a vertical section, on an enlarged scale, on the line 2—2 of Fig. 1 and shows in detail the application of what is now considered to be the preferred form of air brake flap to the wing of a conventional airplane.

Fig. 3 is a perspective view of a fragmentary portion of the wing flap.

Fig. 4 is an end elevational view of the flap illustrated in perspective in Fig. 3.

Fig. 5 is a cross sectional view of an airplane wing showing in detail the application thereto of a somewhat modified form of air brake flap.

Fig. 6 is a perspective view of the air brake flap illustrated in Fig. 5.

Fig. 7 is a sectional view on the line 7—7 of Fig. 6.

Fig. 8 is a sectional view on the line 8—8 of Fig. 6.

Fig. 9 is a sectional view on the line 9—9 of Fig. 6.

Fig. 10 is a cross sectional view of an airplane wing showing the application thereto of a further modified form of air brake flap.

Fig. 11 is a perspective view of the modified flap device illustrated in Fig. 10.

Referring to the drawings in detail the numeral 10 generally indicates the fuselage of an airplane to which is attached a wing 12 and a tail group 14. The wing is provided with controllable ailerons 16 for controlling the lateral stability of the airplane and the tail group is provided with suitable control surfaces such as the elevator 18 and rudder 20. The airplane is powered by a suitable form of power plant such as an internal combustion engine enclosed in the stream lined cowl 22 and driving a propeller 24 to supply the tractive force for the propulsion of the airplane.

There are certain operative conditions under which it may be desirable to reduce the speed of an airplane by increasing its drag. Under some of these conditions, as when landing a fast airplane having a high wing loading, it is usually desirable to increase the wing lift at the same time that the speed is reduced by increasing the drag, and this may be conveniently accomplished by various devices such, for instance, as the trailing edge wing flap well known to the art. There are certain other conditions, however, under which it is desirable to decrease the speed of the airplane without affecting the wing lift. One such condition occurs in the operation of the type of military airplane known as the dive bomber, in which it is necessary to place the airplane in a vertical dive in order to properly aim the bomb. As most of the ships of this type have an especially clean design to give them the maximum speed and economy under normal conditions of operation, when they are placed in a vertical dive their speed soon becomes excessive so that they can not be brought out of the dive without material inconvenience and even danger to the occupants of the airplane. Also as it is desired under these conditions to maintain the airplane in a straight and steady vertical direction, it is apparent that a device such as a trailing edge wing flap which tends to alter the lift of the wings would tend to throw the airplane out of balance and make it more or less unmanageable at the high speed obtained and difficult to maintain in a straight vertical path so that the bombs can be accurately aimed. At first glance it might appear that a solid flap hingedly connected to the wing or some other suitable part of the airplane so that it could be raised to increase the effective thickness of the wing would serve the purpose of providing the necessary additional drag. It has been found, however, that such a solid flap not only affects the lift of the wing by changing the effective contour of the wing section, but also causes an excessive turbulence in the wake of the wing, such that the surfaces of the tail group of the airplane are seriously affected by the influence of this turbulence and the airplane is rendered difficult to handle and its integrity is seriously threatened when its speed is high.

In order to overcome the difficulties enumerated, it was conceived that a flap having a plurality of relatively narrow spaced apart projections, elsewhere referred to herein as fingers, or rake teeth, so that the air could flow between the projections as well as over the flap, could be made to offer the necessary resistance or drag and at the same time would produce only a fine grained turbulence in the wake of the wing, which turbulence would not seriously affect the control surfaces of the tail group or minimize to any appreciable extent their control functions.

With this end in view applicant has applied to the airplane, a pair of flaps, of a type which he has designated as hay rake flaps, generally indicated at 26 in Fig. 1. These flaps are disposed in the top surface of the wing one upon each side of the fuselage 10 and are preferably arranged in the wing space between the inner ends of the ailerons 16 and the adjacent sides of the fuselage. Preferably the flaps are arranged parallel to the longitudinal axis of the wing and are so located that the forward edge of each flap is on a line which approximately tri-sects the chord of the wing so that the forward edge of the flap is positioned at one-third, or approximately 30% of the distance from the leading edge to the trailing edge of the wing.

As the two flaps, disposed upon opposite sides of the fuselage, are similar in all respects, it is believed that a detailed description of only one of them is sufficient for the purpose of this disclosure.

The wing 12 to which the flap is attached may be of any special or conventional design as long as it has an internal supporting structure sufficiently rigid to carry the loads imposed thereon by the flaps when in their operative or extended positions. Such a wing is ordinarily provided with a front spar member 28 and may also have a rear spar member as indicated at 30 in Fig. 5. If the wing is of the mono-spar type having only a single spar as illustrated in Fig. 2, it is customary to locate such single spar at approximately one-third of the distance from the leading to the trailing edge of the wing. In this type of wing the portion of the wing behind the spar comprises a plurality of rib members 32 connected at their forward ends to the rear side of the spar and suitably braced together to provide a rigid and unitary wing structure. The leading edge 34 is ordinarily made separate and attached to the forward side of the spar to complete the contour of the wing. In what is now considered to be the preferred form of the invention, the wing is provided in its upper surface immediately to the rear of the spar 28 with a depression 36 shaped to receive a flap member generally indicated at 38. In this form of the invention the flap member is preferably built up of sheet metal and comprises a front or top plate 40 having a base portion 42 and a plurality of equally spaced finger-like projections 44 along one edge thereof. A channel member 46, preferably formed of sheet metal, is secured to the undersurface of the base portion of the plate 40 by suitable means such as the rivets 48 to form a reinforced box construction for that portion of the flap. A flanged channel member 50 is secured to the undersurface of each of the projections 44 to reinforce the projections by providing each of them with a cross section in the form of a hollow substantially square rectangle. The channel members 50 are provided with outwardly turned flanges 52 which rest upon and are attached to the side of the channel member 46 underlying the roots of the projections 44 to provide a solid connection between the channel member 46 and the channel members 50 and a consequently rigid construction of the flap. Along its edge opposite the projections 44 the plate 40 is attached to one side of an elongated hinge 54, the opposite side of which hinge is connected to the upper flange of the spar 28 as clearly illustrated at 56 in Fig. 2. This construction obviously provides a strong and rigid flap member having finger-like projections upon its trailing edge, which flap member is movable, or adjustably secured to the wing supporting structure such as the spar 28, and normally lies within the depression or pocket 36 so that the outer surface of the plate 40 of the flap provides a smooth continuation of the upper surface of the wing and the flap has no effect upon the operation of the wing under these conditions. In order to provide the necessary additional drag to slow up the airplane, it is necessary to swing the flap about the hinge 54 to move the projections 44 out of the pocket 36 and into the stream of air flowing across the upper surface of the wing. This operation may be accomplished by suitable manually actuatable or controllable means such as the screw-jack generally indicated at 58. This screw-jack has a screw element 60 pivotally connected to the flap intermediate its width by a suitable pivotal joint as indicated at 62 and a nut element 64 pivotally connected to the lower flange of the spar 28 by a suitable pivotal connection as indicated at 66. Surrounding the lower end of the nut element is a gear box 68 which contains a pair of bevel gears, one of which is secured upon the end of the nut element and the other of which is secured to a manually rotatable shaft leading to the pilot's compartment within the fuselage 10 so that by rotating the shaft the screw-jack 58 may be operated to swing the flap 26 about the hinge 54 to move the projections 44 out of the wing depression 36 and into the air stream flowing across the upper surface of the wing or to move the flap back into the wing depression.

In order to avoid the turbulence effect which will adversely affect the control surface of the tail group, it has been found desirable to proportion the projections 44 so that the space between adjacent projections is approximately three times the width of any one of the projections in those cases where the projections are all of the same size and are equally spaced.

In the modified form of the invention illustrated in Figs. 5, 6, 7, 8 and 9, the flap or brake member 67 is made up of a pair of stamped out sheet metal plates joined together along their overlapping edges as indicated at 68 so that, when the two plates are secured together as indicated, they provide a hollow member comprising an elongated base portion 70, and integral hollow projections 72 extending outwardly from the base portion in mutual alignment with each other. These projections are preferably spaced apart so that the distance between adjacent projections is approximately three times the width of any one projection. The brake member 67 is secured in operative position in the wing by disposing the same in a vertical slot or pocket 74 provided in the wing, the slot being defined by a plurality of mutually aligned U shaped brackets 76 secured to the wing ribs 78 or to other suitable members of the internal structure of the wing. The brake member 67 is vertically slidable in the slot 74 and is provided with two or more vertically disposed racks 80 having teeth which mesh with the teeth of corresponding pinions, one of which is indicated at 82 mounted upon a shaft 84 rotatably secured to the wing supporting structure so that upon rotation of the shaft 84 the pinions 82 will be rotated to slide the brake member 67 up and down in the slot 74 by reason of the co-operation of the pinions 82 with the racks 80. The shaft 84 is led to a suitable manual connection so that the same may be rotated by the pilot of the airplane and the projections 72 of the brake member may be moved out of the slot 74 into the air stream flowing over the surface of the wing whenever it is desired to reduce the speed of the airplane, and may be returned to their position within the slot 74 at will. The slot 74 is located at approximately one-third of the distance from the leading edge to the trailing edge of the wing and opens into the upper surface of the wing. Preferably the wing structure is reinforced at the slot by members, not shown, which extend across the slot between the projections 72.

In the further modified form of the invention illustrated in Figs. 10 and 11, the flap or brake member, generally indicated at 85 comprises an elongated tubular base member 86 to which are welded a plurality of curved prong-like projections 88 equally spaced apart along one side of the base member. The base member 86 is secured to the wing spar 90 by means of a pair of brackets 92 which have one end rigidly secured to the corresponding ends of the base mmber and have their opposite ends pivotally secured to the web portion of the wing spar. The connection between the brackets 92 and the gusset plate 94 is disposed somewhat rearwardly of the spar 90 and immediately below the upper surface of the wing as clearly indicated at 96 in Fig. 10, to bring the projections in approximate coincidence with the front trisection line of the wing chord. The curvature of the extensions 88 is along an arc centered upon the center of the pivotal connection 96 so that as the brackets are swung about their respective pivotal connections, the projections may be moved through apertures 98 in the upper surface of the wing, which apertures are only slightly larger than the projections.

The brake member 85 is suitably moved from its retracted position as indicated in broken lines in Fig. 10 to its extended position as indicated in full lines and vice versa by a manually controllable mechanism comprising a pair of hydraulic struts 100 connected between respective gusset plates 94 and brackets 92. As illustrated, one end of the strut 100 is pivotally connected to the gusset plate adjacent the lower end thereof as indicated at 102, and the other end is pivotally connected to the respective bracket intermediate its length as indicated at 104. Hydraulic fluid is supplied to and drained from the struts 100 by suitable conduits as indicated at 106 and 108, such conduits being connected with a suitable source of hydraulic fluid under pressure and provided with suitable manually operable valve means so that the struts may be actuated to move the brake member to its extended or retracted position at the will of the pilot of the airplane to which the brake device is applied.

While the specific operating means have been illustrated as applied to the different flap or brake element modifications, it is to be understood that the invention is in no way limited to such applications, but that any suitable actuating device may be used with any of the flap or brake elments illustrated, and that the brake elements or flaps themselves may take various other constructional forms than those illustrated so long as the element is provided with spaced projections to maintain the turbulence in the wake of the wings in a fine grained condition.

While there has been illustrated and described a specific mechanical embodiment of the device of the invention and two somewhat modified forms therof by way of illustration, it is to be understood that the invention is not limited to the specific embodiments so illustrated and described, but that such changes in the size, shape, and arrangement of parts may be resorted to as come within the scope of the appended claims.

Having now described the invention so that others skilled in the art may clearly understand the same, what it is desired to secure by Letters Patent is as follows:

What is claimed is:

1. In combination with an airplane and a wing therefor, means for temporarily decreasing the speed of said airplane by increasing the drag of said wing comprising, a spanwise elongated member movably secured to the supporting structure of said wing, a plurality of substantially rigid equally spaced aligned projections on said movable member normally constituting a portion of the wing surface, the distance between adjacent projections being at least three times the width of any single projection, and means for moving said elongated member to move said projections to a position transverse to the air stream flowing over the surface of said wing.

2. In combination with an airplane and a smooth surfaced wing therefor, means for temporarily reducing the speed of said airplane by increasing the drag of said wing comprising, an elongated base member disposed at all times within said wing, a plurality of aligned spaced apart curved projections on one side of said base member, said projections having a width along said base member not materially greater than the corresponding width of the spaces between adjacent projections, brackets pivotally connecting said base member to the supporting structure of said wing, and manually controllable means for projecting and retracting said projections through suitable apertures provided in the upper surface of the wing.

3. A wing flap for an airplane comprising a plate including a base portion and a plurality of integral projections along one side of said base portion spaced by intervening open indentations, a reinforcing member of channel section secured to one side of said base portion, and a reinforcing member of channel section secured to the corresponding side of each of said projections and rigidly secured at one end to said base portion reinforcing member.

4. A wing flap for an airplane comprising a pair of complementary members formed up of sheet metal and secured together to provide a hollow base portion and a plurality of separate integral hollow dentils along one side of said base portion.

5. A wing flap for an airplane comprising, a tubular base member, a bracket rigidly secured to each end of said base member, and a plurality of tubular extensions secured at equally spaced intervals along one side of said base member and curved along arcs centered on a line joining the ends of said brackets remote from said base member.

6. In combination with an airplane and a smooth surfaced wing therefor, means for temporarily decreasing the speed of said airplane by increasing the drag of said wing comprising, a spanwise member including an elongated base portion and a series of substantially rigid projections along one side of said base portion extending substantially perpendicular to the longitudinal axis thereof and separated from each other by air flow gaps each having a spanwise dimension not less than the spanwise dimension of the adjacent projections, and means for moving said member from a position in which it is received entirely within the contour of said wing to a position in which said projections extend transversely to the airstream flowing past said wing.

7. An air resistance brake for an airplane comprising, a spanwise member hinged along one edge to the airplane wing intermediate the chord length thereof, and a series of separated dentils along the free edge of said spanwise member movable from a position in which they are substantially flush with the surface of said wing to a position in which they project into, and transversely of the airstream flowing past said wing, said dentils having a length at least as great as their width and being located at such intervals as to provide open interdentil airflow spaces at least as wide as said dentils.

8. An air resistance brake for an airplane comprising, a spanwise member hinged along one edge to the airplane wing, and a series of projections along the free edge of said spanwise member movable from a position in which they are substantially flush with the surface of said wing to a position in which they project into and transversely of the airstream flowing past said wing, said projections being arranged along the free edge of said spanwise member and separated by open airflow spaces and having a total combined area opposed to the airflow not greater than the total combined area of the intervening spaces.

9. In combination with an airplane wing, an air resistance brake comprising, a plurality of individual airflow disturbing elements movable from a position in which they are received wholly within the contour of the surface of said wing to a position in which they extend beyond said wing surface and are disposed substantially at right angles thereto, said elements being spaced apart to permit airflow therebetween and having individually a width in a spanwise direction smaller than their length in the direction in which they extend from said wing surface.

10. In combination with an airplane and a wing therefor, means for temporarily increasing the drag of said airplane comprising, an elongated member movably secured to the supporting structure of said wing, a plurality of spaced apart substantially rigid projections operatively associated with said movable member for movement thereby, the spaces between adjacent projections being greater than the widths of the individual projections, and means for moving said elongated member to move said projections out of the contour of said wing and into a position substantially transverse to the airstream flowing over the surface of said wing.

JOHN G. LEE.